United States Patent [19]

Cross

[11] Patent Number: 4,706,114
[45] Date of Patent: Nov. 10, 1987

[54] COLOR PROCESSING SYSTEM FOR TELEVISION CAMERA

[76] Inventor: Neill C. Cross, Star Rte. Box 270, Morristown, Ariz. 85342

[21] Appl. No.: 710,676

[22] Filed: Mar. 12, 1985

Related U.S. Application Data

[63] Continuation-in-part of Ser. No. 377,342, May 12, 1982, abandoned.

[51] Int. Cl.$^4$ ............................................... H04N 9/09
[52] U.S. Cl. ...................................... 358/50; 358/43; 358/41
[58] Field of Search ................... 358/50, 55, 43, 41, 358/48; 250/226; 356/416, 419; 313/367

[56] References Cited

U.S. PATENT DOCUMENTS 3,717,724  2/1971  Montgomery, III .................. 358/43

Primary Examiner—Tommy P. Chin
Assistant Examiner—Victor R. Kostak
Attorney, Agent, or Firm—Nissle & Leeds

[57] ABSTRACT

An improved color processing system for a color television camera. The color processing system receives panchromatic light focused by the lens of the camera to form an image beam and produces an electrical monochromatic signal of the image beam, primary additive color signal of the image beam, and primary subtractive color signal of the image beam. The system includes a first transparent photosensitive surface for receiving at least a portion of the panchromatic image beam and producing an electrical signal thereof; a first transparent color filter for receiving at least a portion of the panchromatic image beam, the first filter permitting a primary subtractive color image beam to pass therethrough; a second transparent photosensitive surface for receiving at least a portion of the primary subtractive color image beam passed by the first color filter and producing an electrical signal thereof; a second transparent color filter for receiving at least a portion of the primary color light image beam passed by the second photosensitive surface, the second filter passing the image beam as a primary additive color; and a third photosensitive surface for receiving at least a portion of the primary additive color image beam passed by the second transparent color filter and producing an electrical signal thereof.

2 Claims, 7 Drawing Figures

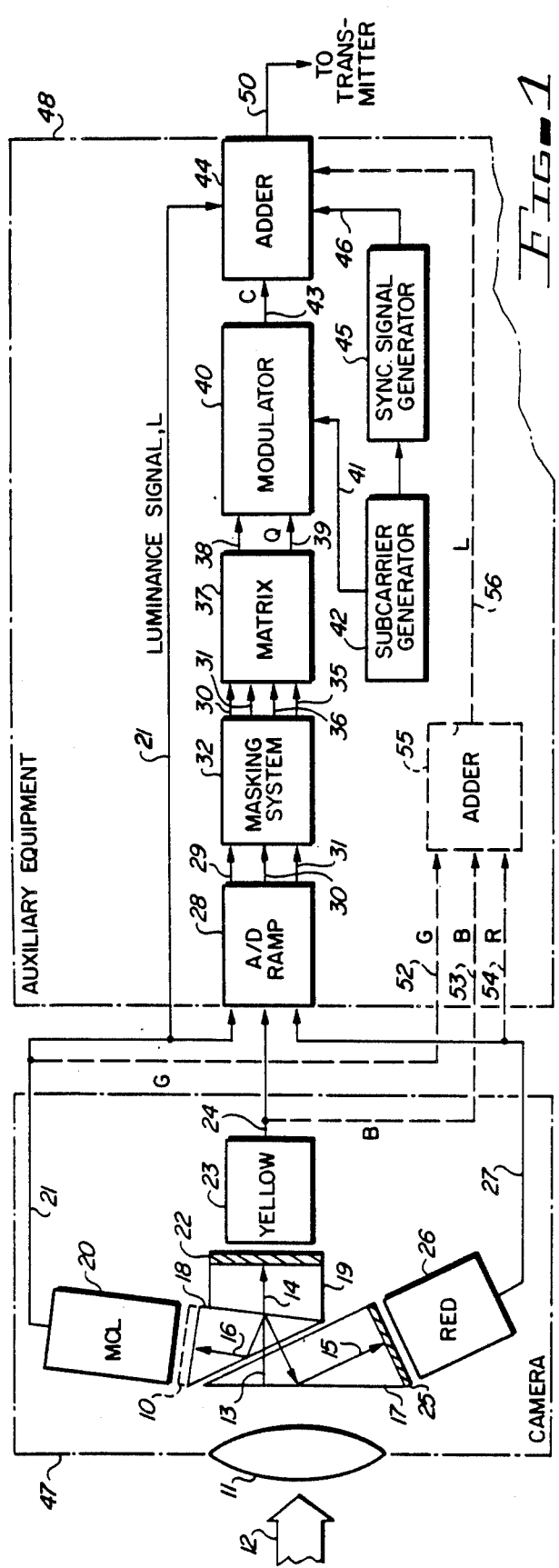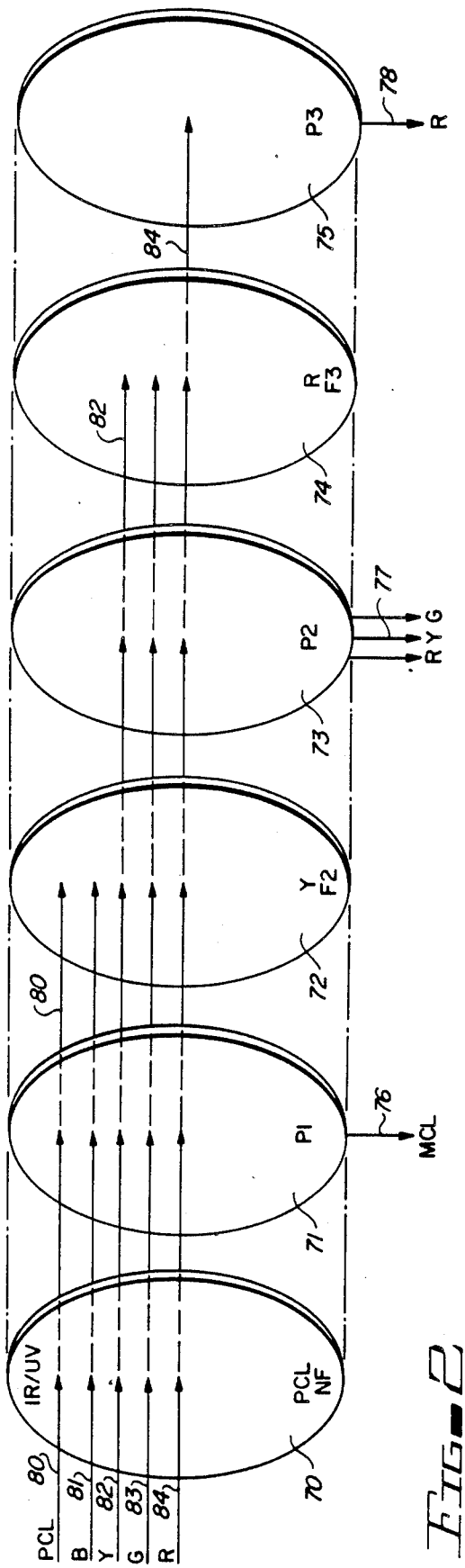

COLOR PROCESSING SYSTEM FOR TELEVISION CAMERA

This is a continuation-in-part from my application Ser. No. 377,342, filed May 12, 1982, now abandoned.

This invention relates to light processing systems for color cameras.

More particularly, the invention relates to an improved light processing system which can be readily installed in and adapted to conventional color television cameras of the type which receive monochromatic light from a scene being viewed by the camera, optically focus the light to form an image, optically split the focused image light beam into at least three separate beams to produce resulting red, blue and green image beams of light, and which then produce electrical signals representing each of said resulting red, blue and green image beams.

In another respect, the invention relates to an improved color camera light processing system which does not require that the monochromatic light image beam formed by a color camera lens be split into three separate beams, the improved system eliminating beam splitting prisms and comparable optical components found in conventional color television cameras.

In a further respect, the invention relates to an improved color camera light processing system which, in comparison to beam splitting and color filtering systems found in conventional television cameras, substantially minimizes attenuation which occurs during processing of a focused monochromatic light beam to produce color video signals.

In a further and more specific respect, the invention relates to an improved color camera light processing system which does not require three separate vidicons, CCD's (charge coupled device sensors) or other photosensitive devices to convert a primary light color image beam to an electronic video signal.

In still another respect, the invention concerns an improved color camera light processing system which does not filter the panchromatic image beam formed by a camera lens to produce the conventional combination of red, blue and green image light beams.

In yet another respect, the invention concerns the improved color camera light processing system which has no inherent physical limitation as to the number of pixels of information which can be produced therefrom and which, consequently, has the potential of producing extremely high resolution (HDTV) video signals.

In a further respect, the invention concerns an improved color camera light processing system which does not require the compositing of primary additive color video signals to produce a black and white or monochrome luminance signal.

In another respect, the invention concerns an improved color camera light processing system which can be readily implemented utilizing either existing analog signal tube technology or utilizing solid state digital signal technology.

In a further and more specific respect, the invention concerns an improved color camera light processing system which, by producing monochromatic, primary additive color, and primary subtractive color video signals from the panchromatic image beam formed by the camera lens, structurally simplifies and improves the resolving capability of existing camera color processing systems.

In existing color television cameras light from the scene in front of the camera is captured and focused into an image beam by the camera lens. This panchromatic image beam is then split into three separate beams by a prism or mirror system. The strength of each of the three separate beams is approximately one third the strength of the original image beam produced by the camera lens. Each of the three image beams is then individually passed through a color filter so that individual red, blue and green image beams are produced. Each of these resulting colored image beams is received by a photosensitive vidicon or similar pick up tubes, or by a CCD (charge coupled device). An electronic video signal for one of the primary additive color beam is produced by each of the three vidicons or CCD's. Portions of the red, blue and green video signals from the vidicons or CCD's are directed to an adder which electronically combines the signals to produce a composite black and white "luminance" or brightness signal. Portions of the red, blue and green video signals are also directed to an electronic matrix which combines the signals to form orange-cyan and blue-green-magenta signals which are combined with a subcarrier signal to produce a "chrominance" signal. The chrominance and luminance signals are combined to form the overall color picture signal which is subsequently transmitted to residential television sets.

Several disadvantages are associated with the above-described conventional light processing system for color cameras. First, by the time each color image beam reaches its respective vidicon or CCD the intensity of the colored light beam is markedly less than the intensity of the panchromatic light beam image initially produced by the camera lens. This beam attenuation occurs because a prism or mirror system splits the original panchromatic image beam into three beams each having approximately one-third the intensity of the original image beam. The intensity of each of these three separate beams is further reduced as they pass through a red, green or blue filter. Red, blue and green filters commonly attenuate the intensity of a light beam by from twenty to thirty percent or more.

Another problem associated with conventional color television cameras is that the utilization of a beam-splitting system and a vidicon or CCD for each of the three primary color beams produced contributes to the bulk of the camera and makes the camera more susceptible to damage when it is jarred or subjected to to externally originating vibrations. A further drawback of existing cameras is that vidicons and CCD's have inherent physical and operation limitations which make the production of very high resolution pictures difficult.

Another difficulty with existing television camera color processing systems is they have long adhered to the production of red, blue and green (the primary additive colors) image signals. As a result, the color camera or auxiliary camera apparatus must include a system for combining the red, blue and green video image signals produced by vidicons or CCD's to form a composited black and white luminance signal. If a "true" black and white signal produced by a separate CCD or vidicon were available, image enhancement requirements would be simplified. Similarly, colors other than red, blue and green are often desirable in the production of a color television signal. For instance yellow is desirable in enhancing and controlling skin tones.

Accordingly, it would be highly desirable to produce a color camera light processing system which would minimize the reduction in beam intensity which occurs during processing of the initial panchromatic camera lens image beam to produce separate red, blue and green image beams.

It would also be highly desirable to produce a color camera light processing system which would eliminate having to utilize a beam splitting system and three separate CCD's or vidicons in order to produce video signals and which would consequently simplify system components and reduce the susceptibility of such components to damage when the camera housing is vibrated or jarred.

It would also be highly desirable to provide an improved color camera light processing system which would, while simplifying the structure of existing color television cameras and offering an improvement in the resolution of the picture produced by the camera, produce a "true-pure" black and white signal.

Therefore, it is a principal object of the invention to provide an improved light processing system for a color camera.

A further object of the invention is to provide a color camera light processing system which minimizes the attenuation of the camera lens panchromatic image beam as the beam travels through the camera color light processing system.

Another object of the instant invention is to provide an improved color camera light processing system which does not require that the initial monochromatic image beam passing through the lens into the camera be optically split into three separate beams and which does not require the utilization of three separate vidicons or CCD's to produce electronic color video signals.

Yet another object of the present invention is to provide an improved color processing system for a camera which can be readily integrated in existing television cameras which utilize vidicon or other types of analog signal tubes to produce electronic video signals.

Another and further object of the invention is to provide an improved color camera light processing system which produces a "true" black and white video signal.

Still a further object of the invention is to provide a color camera light processing system which has the capability of producing very high resolution video signals.

These and other futher and more specific objects and advantages of the invention will be apparent to those skilled in the art from the following detailed description there, taken in conjunction with the drawings, in which:

FIG. 1 is a schematic diagram of one embodiment of the invention integrated with a conventional television camera which utilizes CCD's (charge coupled devices) to produce three separate video signals, each representing a differently colored image beam;

FIG. 2 is a schematic representation of another embodiment of the invention which does not require the utilization of optical beam splitting systems, vidicons or CCD's found in present day conventional color television cameras;

Figure 5:
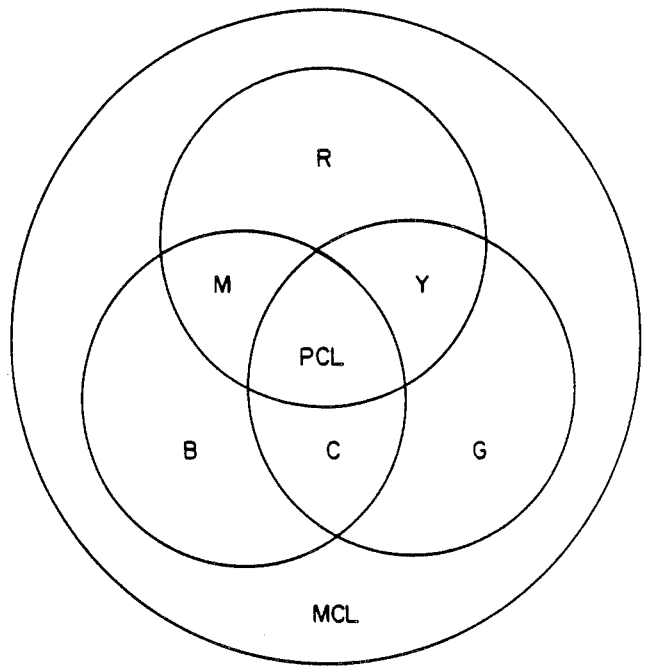
Figure 4:
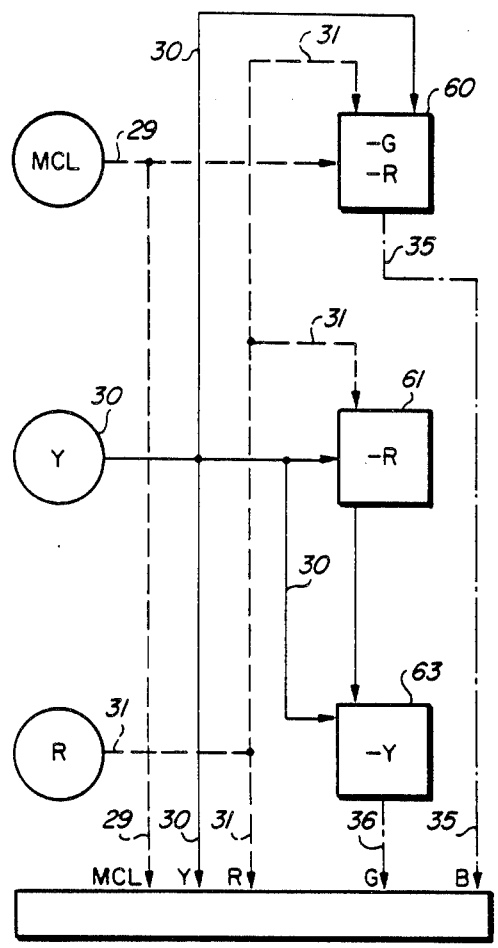
Figure 6:
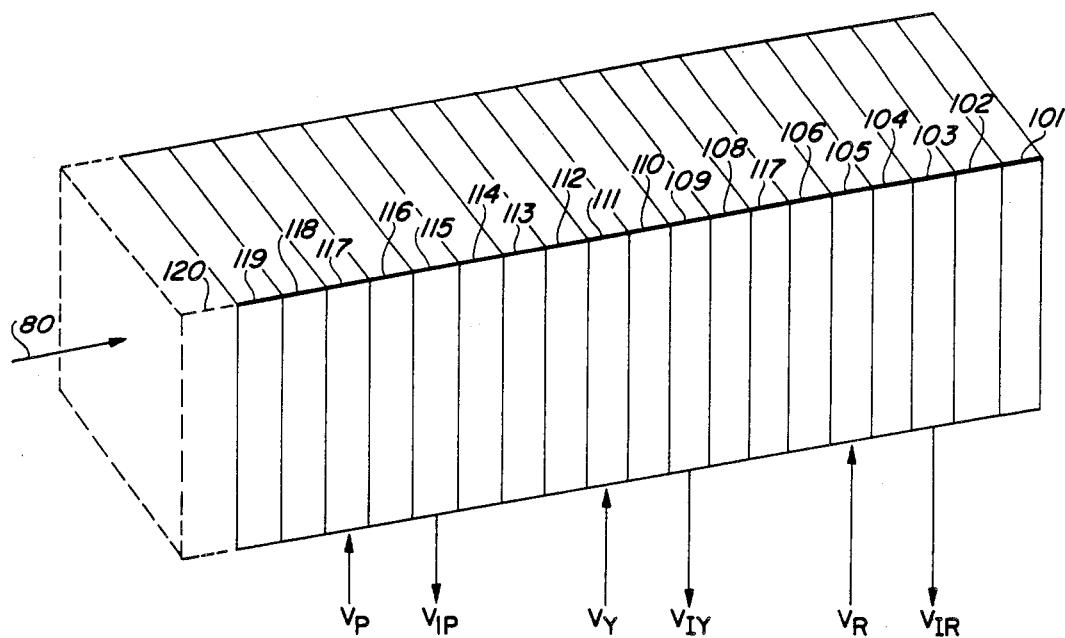
Figure 7:
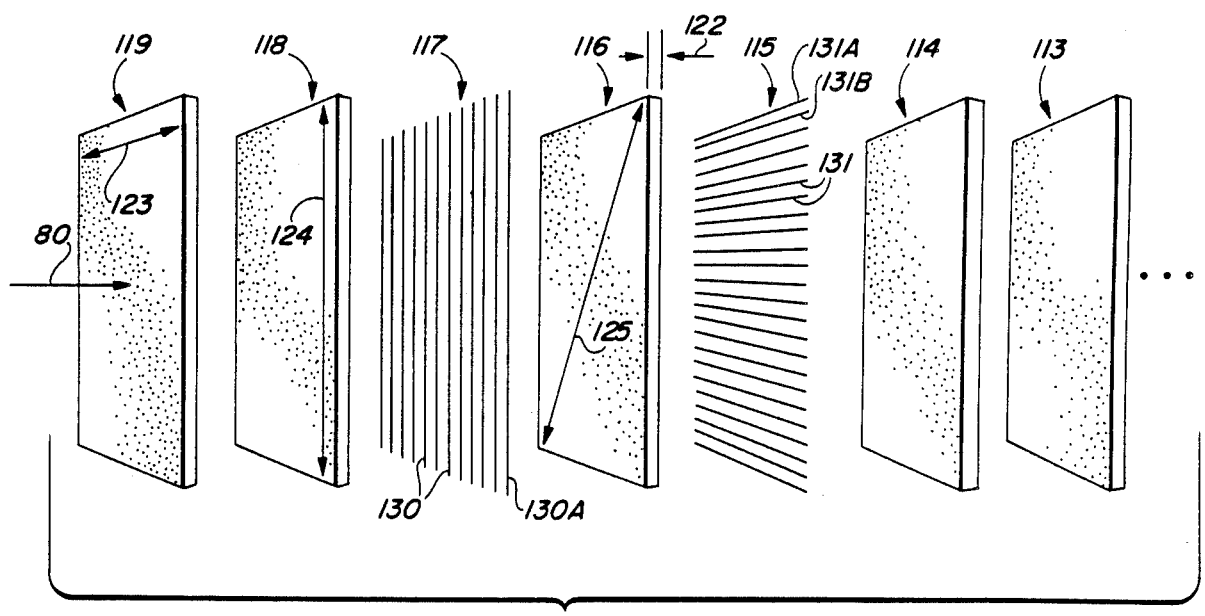

FIG. 4 is a schematic diagram illustrating a color masking system which could be utilized to digitally compare digital signals representing monochromatic, yellow and red image beams to further produce digital signals representing blue and green image beams; and FIG. 5 is a color chart identifying the primary additive and primary substractive colors found in a panchromatic light beam FIG. 6 is a panchromatic light processing water FIG. 7 is an exploded view of the wafer of FIG. 6.

Briefly, in accordance with one embodiment of the invention, I provide an improved color processing system for a color camera. The color processing system includes a lens for receiving panchromatic light rays from a scene viewed by the camera and for focusing the light to form an image beam; means for receiving and splitting the panchromatic light image beam into at least three separate resultant panchromatic light beams; a first color filter to receive one of the resultant panchromatic light beams and pass the light image beam as a primary additive color image beam; a second color filter to receive another of the resultant panchromatic light beams and to pass the light image beam as a primary subtractive color beam; first photosensitive means for receiving the primary additive color beam and producing an electrical signal thereof; second photosensitive means for receiving said primary subtractive color beam and producing an electrical signal thereof; and third photosensitive means for receiving the remaining one of the three resultant panchromatic beams and producing an electrical signal thereof. The color camera may also include masking means for receiving the electrical color signals from the first, second and third photosensitive means and for producing three electrical signals of said image, each of said electrical signals representing said image as a different one of the three primary additive colors.

In accordance with another embodiment of the invention, I provide an improved color processing system for a color camera. The color processing system receives light focused by the lens of camera into an image beam and produces an electrical panchromatic signal of the image beam, electrical primary subtractive color signal of the image beam and primary additive color signal of the image beam. The light processing system includes a first transparent photosensitive surface for receiving the panchromatic image beam and producing an electrical signal thereof; a first transparent color filter for receiving light passed through said first photosensitive surface, the first filter permitting a primary subtractive color image beam to pass therethrough; a second transparent photosensitive surface for receiving the primary subtractive color image beam passed by the first color filter and producing an electrical signal thereof; a second transparent color filter for receiving the light image beam passed by the second photosensitive surface, the second filter passing the primary subtractive color image beam as a primary additive color image beam; and a third photosensitive surface for receiving the primary additive color image beam passed by the second transparent color filter and producing an electrical signal thereof. The color processing system may also include masking means for receiving the electrical signals produced by the first, second and third photosensitive surfaces and producing three electrical signals of the image beam, each of the electrical signals representing the image beam in a different one of the three primary additive colors.

Turning now to the drawings in which the presently preferred embodiments are shown for the purpose of illustrating the practice thereof and not by way of limitation of the scope of the invention and in which like elements are indicated by corresponding reference characters throughout the several views, FIG. 1 is a schematic representation of a conventional television camera modified in accordance with one embodiment of the invention and including lens 11 for focusing panchromatic light 12 from the scene viewed by the camera. The panchromatic image beam 13 produced by lens 11 is split into three separate image beams 14 15, 16 by prisms 17, 18, 19. Beam 16 is received by CCD (charge coupled device) 20 which generates electrical analog signal 21. Beam 14 passes through yellow filter 22 and is received by CCD 23 which generates analog signal 24. Image beam 15 passes through red filter 25 and is received by CCD 26 which generates electrical analog signal 27. Analog signals 21, 24, 27 represent, respectively, panchromatic, yellow and red image beams. Analog signals 21, 24, 27 are directed to analog/digital (A/D) ramp 26 which converts the signals from analog to digital form. Digitalized panchromatic, yellow and red signals 29, 30, 31 are received by masking system 32 which electronically compares the signals to form green and blue signals to complement signals 29–31. Consequently yellow 30, red 31, blue 35 and green 36 signals are directed from masking system 32 to matrix 37 which generates the "I" 38 and "Q" 39 signals combined by modulator 40 with subsignal 41 from subcarrier generator 42 to form the chrominance or color signal 43. Adder 44 combines chrominance signal 43 with luminance or black and white signal 21 and synchronizing generator 45 signal 56 to form the overall color picture signal 50 transmitted to residential television sets.

Lens 11, prisms 17–19, filters 22, 25 and CCD's 20, 23, 26 are normally carried in color camera 47 while the remaining components shown in FIG. 1 are housed in auxiliary camera equipment 48.

In a conventional color television camera filter 22 of FIG. 1 passes blue light and an additional color filter indicated by dashed lines 10 is utilized adjacent prism 18. Filter 10 passes green light. Thus, in a conventional camera, CCD's 20, 23, 26 produce electrical signals representing, respectively, green, blue and red image beams. A separate black and white or monochromatic luminance signal is not produced in the camera. Instead, in order to produce the black and white luminance signal, green, blue and red image beam signals, indicated by dashed lines 52, 53, 54, are combined by an auxiliary adder 55 to produce luminance signal 56. Composite or "untrue" luminance signal 56 is, in conventional color television equipment, combined with the chrominance signal from modulator 40. Chrominance signal 43 is generated in a conventional camera by directing a portion of signals 52–54 into matrix 37. Matrix 37 then generates "I" and "Q" signals utilized by modulator 40 to produce chrominance signal 43.

Matrix 37 can be adapted to receive analog or digital signals as desired. Analog signals are generated by vacuum tubes such as vidicons, trividicons, etc. while digital signals are generated by solid state electronic components such as CCD's.

A masking system which could be utilized as reference character 32 in FIG. 1 is illustrated in FIG. 4. In the masking system of FIG. 4 digital electronic signals representing the monochromatic image beam 29, yellow image beam 30, and red image beam 31 are electronically compared to form blue 35 image beam signals. In particular, monochromatic, red and yellow electronic digital signals 29–31 are compared in module 60 to form blue light image signal 35. Yellow and red digital signals 30, 31 are compared in module 61 to form yellow-green signal 62 which is compared with yellow image signal 30 in module 63 to produce green image signal 36. Color signals 29–31, 35, 36 produced by masking system 32 can be directed to matrix 37.

The presently preferred embodiment of the invention is depicted in FIG. 2 and includes infra-red/ultra violet filter 70, photoreceptive material disk 71, filter 72 which passes yellow light, photoreceptive disk 73, filter 74 which passes red light, and photoreceptive disk 75. Filters 70, 72, 74 and photoreceptive surfaces 71, 73, 75 are transparent. Photoreceptive surfaces 71, 73, 75 can be formed in the manner of conventional semiconductor substrates by evaporating silicon, germanium, etc. in a desired combination of N, P or other layers. Transparent color filter layers 72, 74 and infra-red layer 70 can similarly be formed by evaporating color gelatins on the semiconductor layers 71, 73, 75. Thus, although the six layers of FIG. 2 are illustrated as being separated from one another for purposes of explanation of the invention, in actual use it is envisioned that they would be formed next to one another as a lightweight, compact six-layer wafer.

Camera lens 11 focuses light entering camera 47 to form panchromatic light image beam 80 shown passing into and through IR/UV filter 70 in FIG. 2. Panchromatic light image beam 80 includes blue 81, yellow 82, green 82 and red 84 colors. After passing through IR/UV filter 70 panchromatic light image beam 80 traverses photoreceptive disk 71. Photoreceptive disk 71 generates a digital electronic (or if preferred analog) signal 76 representing the panchromatic image beam 80. Since filter 72 only passes yellow light, photoreceptive disk 73 outputs a digital electronic signal 77 representing a yellow image beam. Filter 74 permits the red component 84 of yellow image beam 82 to pass and photoreceptive disk 75 outputs a digital electronic signal 78 representing red image beam 84. Digital electronic signals 76, 77 and 78 are directed to a masking system comparable to that described in FIG. 4. The masking system electronically combines the monochromatic, yellow and red digital signals 76–78 to produce digital signals representing blue and green image beams. Monochromatic, yellow, red, blue and green digital signals from the masking system are routed to a matrix 37 and to other components which prepare the signals for transmission in a manner similar to that described above during the discussion of the conventional camera system of FIG. 1.

Figure 3:
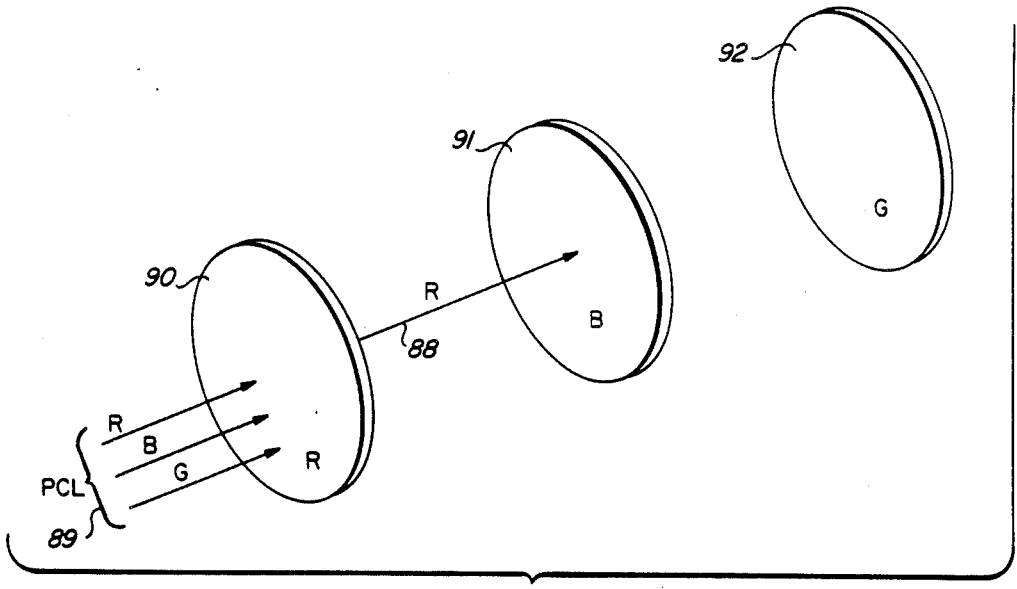
FIG. 3 is a schematic representation demonstrating that a panchromatic light beam cannot be linearly passed through three successive color filters to obtain the three primary additive colors of red, blue and green.

As indicated in FIG. 3, the embodiment of the invention depicted in FIG. 2 could not be utilized if it were intended to produce the three primary additive colors produced by conventional television camera color processing systems. FIG. 5 shows the primary additive and primary subtractive colors comprising a panchromatic (PCL) beam of light. The three primary additive colors are red (R), green (G) and blue (B). When red and green are combined the primary subtractive color yellow (Y) is formed. If blue and green are combined the primary subtractive color cyan (C) is formed and when red and blue are combined the primary subtractive color magneta (M) is formed. Combining the three primary additive colors red, green and blue gives panchromatic light (PCL).

FIG. 3 demonstrates that a beam of panchromatic light 89 cannot be successively directed through three separate filters to individually divide out the red, blue and green components of the panchromatic light beam. After the panchromatic light beam is directed through the first filter 90, which only permits the primary additive red color to pass, both the blue and green components of the panchromatic beam are eliminated from the panchromatic beam. Consequently, passing the red image beam 88 into a blue 91 and or green 92 filter completely extinguishes the light beam. The three primary additive colors which have been so long produced by conventional color television cameras cannot be obtained by passing a panchromatic light beam through the embodiment of the invention shown in FIG. 2. The color filter-photoreceptive wafer combination of FIG. 2 must be utilized to produce electronic digital signals for the incoming panchromatic beam of light and for combinations of primary subtractive and primary additive colors. For instance, the six-layered wafer of FIG. 2 could produce the following combinations of digital electronic signals 76-78 representing colored image beams: Panchromatic, yellow, green; panchromatic, yellow, red; panchromatic, cyan, blue; panchromatic, cyan, green; panchromatic, magenta, blue; and, panchromatic, magenta, red.

The color processing wafer of FIG. 2 has many advantages over conventional beam splitting camera color processing systems. The wafer eliminates both the optical beam splitting systems and the three CCD's or vidicons found in conventional cameras. The wafer is compact and resistant to jarring. The wafer produces ditigal electronic signals representing "virtual" color information which can be tweeked to compensate for any unusual incoming light colormetry; this feature makes the system particularly desirable for applications in outer space, underwater and in other specialized lighting conditions. There is no inherent physical limitation within the wafer system limiting the number of possible pixels of information; hence, the system could have a nearly unlimited resolving capability. The wafer system requires no warm-up period, would require reduced cooling because of the minimal amount of internal heat produced during operation; would require smaller, lighter batteries in portable applications; would conserve energy because of reduced cooling requirements; and would have a longer operating life and more stable operational characteristics.

Further, the wafer system provides a true-pure black and white signal and does not, in contrast to conventional cameras, require that red, blue and green signals produced by the camera be composited to form the black and white liminance signal. The availability of a true, non-composite luminance signal signifies image enhancement requirements. The cost of producing the wafer is substantially less than the cost of producing the beam splitting optics-color filter-CCD combination of conventional color television cameras. The wafer produces a video signal having an excellent signal to noise ratio. The wafer can be easily produced using existing and semiconductor and video equipment manufacturing techniques. Finally, the wafer can be utilized in all color or monochrome applications, including commercial broadcast television, cable television and future high resolution theatrical television transmissions.

As would be appreciated by those of skill in the art, each filter 70, 72, 74 and photoreceptive disk 71, 73, 75 in FIG. 2 could be, if desired, comprised of multiple layers or types of material. Filters 70-74 could be manufactured utilizing colored glass or other materials in place of the color gelatins earlier described. Photoreceptive disks 71, 73, 75 could be also be constructed from a variety of materials. Some or all of filter modules 70, 72, 74 and photoreceptive disks 71, 73, 75 could be separated from other filter modules and photoreceptive disks as pictured in FIG. 2. Finally, in certain applications it might be desirable not to have each filter and photoreceptive disk centered on a singular linear axis as are the filters and disks on FIG. 2.

The construction and functioning of the invention is further understood with reference to the light processing wafer and system shown in FIGS. 6 and 7. The panchromatic light processing wafer of FIG. 6 includes transparent protective face layer 120 (optional); IR/UV filter layer 119; transparent insulating layer 118; transparent conducting scanning vertical grid layer 117; panchromatic transparent photoconductor layer 116; transparent conducting scanning horizontal grid layer 115; transparent insulating layer 114; yellow filter layer 113; transparent insulating layer 112; transparent conducting scanning vertical grid layer 111; yellow transparent photo-conductor layer 110; transparent conducting scanning horizontal grid layer 109; transparent insulating layer 108; red filter layer 107; transparent insulating layer 106; transparent conducting scanning grid layer 105; red transparent photoconductor 104; transparent conducting scanning horizontal grid layer 103; transparent insulating layer 102; and, opaque substrate layer 101. An exploded view of layers 119-113 of FIG. 6 is shown in FIG. 7.

While each layer 101-120 can be of any desired shape and dimension, in the following discussion it is assumed that the horizontal 123 and vertical 124 dimensions of each layer 101-120 are equivalent to those of a conventional 35 mm camera frame and that, accordingly, the diagonal dimension 125 of each layer is 35 mm.

Each vertical grid layer 117, 111, 105 is comprised of a plurality of spaced apart vertical generally optically transparent conductor lines or segments 130. The space between each adjacent pair of conductor segments 130 need not be but is presently generally equivalent to the space between any other adjacent pair of conductor segments 130. Means are provided for individually sequentially placing a reference voltage $V_P$, $V_Y$, $V_R$ across or passing a reference current through each conductor segment 130 in a grid layer 117, 111, 105. If the dimensions of the face of each wafer layer 101 to 120 generally correspond to the dimensions of a conventional rectangular 35 mm camera frame, there are preferably 800 to 1575 parallel spaced apart vertical conductor segments 130 in each vertical grid 117, 111 and 105. Each conductor segment 130 in a grid layer 117,, 111, 105 physically contacts its respective adjacent photoconductive layer 116, 110, 104.

Each horizontal grid layer 115, 109, 103 is comprised of a plurality of spaced apart, parallel, generally optically transparent, horizontally disposed conductor lines or segments 131. The space between each adjacent pair of conductor segments 131 in a horizontal grid layer 115, 109, 103 need not be but is preferably generally equivalent to the space between any other adjacent pair of horizontal conductor segments 131 in a grid layer 115, 109, 103. Means are provided for individually detecting a voltage $V_{IP}$, $V_{IY}$, $V_{IR}$ flowing through each horizontally orineted conductor segment 131 in a grid layer 115, 109, 103. If the dimensions of each wafer layer 101 to 120 generally correspond to the dimensions of a conventional rectangular 35 mm camera frame, there are preferably 525 to 1575 parallel, spaced apart, horizontal conductor segments 131 in each horizontal grid layer 115, 109, 103. Each conductor segment 131 in a grid layer 115, 109, 103 physically contacts its respective adjacent photoconductive layer 116, 110, 104. The wafer of FIGS. 6 and 7 is fabricated with insulating material between each adjacent pair of conductor segments 130 or 131 in a grid layer so that current will not flow therebetween.

As would be appreciated by those skill in the art, the wafer of FIGS. 6 and 7 is fabricated utilizing conventional silk screening, vacuum deposition, chemical or electrochemical techniques for depositing thin films of generally uniform thickness. For example, a transparent insulating layer 102 of borosilicate glass, alumina glass or other suitable transparent material is deposited on an opaque substrate 101. A plurality of horizontal transparent conducting lines 131 in grid layer 103 is formed on layer 102 by vacuum deposition or other appropriate means. Each conductor segment 131 comprises a thin generally optically transparent layer of aluminum or other electrically conductive material. After segments 131 are formed on insulating layer 102, a coating or other electrical insulating material can be applied between each adjacent pair of electrically conductive segments 131. A layer of photoconductive material 104 is formed over and contacting electrically conductive segments 131. Layer 104 is comprised of lead oxide, selenium oxide or of any generally optically transparent material whose electrical resistance increases or decreases when light strikes the material. A plurality of spaced apart, parallel, vertical, transparent electrically conductive segments 130 is formed on photoconductive layer 104. Electrically conductive segments 130 are preferably formed of the same material as electrically conductive segments 131. Transparent insulating layer 106 of silicon or other electrical insulating material is formed over and between each pair of conductive segments 131 to prevent current from jumping or passing between adjacent segments 131. Red filter layer 107 is deposited or otherwise formed or positioned adjacent transparent insulating layer 106. Layer 107 is comprised of a plastic, a silicate base gelatin or other suitable material and only permits red light to pass therethrough. Filter layer 113 only permits yellow light to pass therethrough. Filter layer 119 permits all wavelengths of light to pass therethrough excepting UV and IR wavelengths.

The remaining layers 108-120 of the wafer of FIG. 6 are formed in a manner similar to that described above for layers 101 to 107. The thickness 122 (FIG. 7) of each layer 101-120 can vary as desired; however, it is presently preferred that each layer 101 to 120 be of uniform thickness 122 over the entire layer. Each layer 102 to 120 can be of a differing thickness. A uniform thickness of approximately 0.00003 inches for each layer is presently preferred.

Each vertical conducting grid layer—photoconductive layer—horizontal conducting grid layer combination 117-116-115, 111-110-109, 105-104-103 is utilized to generate electrical signals $V_{IP}$, $V_{IY}$, $V_{IR}$ transmitted to the masking system 32 for processing. Since each vertical grid layer—photoconductive layer—horizontal grid layer combination operates in similar fashion, only the 117-116-115 combination will be discussed in detail. If there is not a light image beam 80 passing into the wafer of FIGS. 6 and 7 and a voltage is placed across vertical conductor segment 130A in grid layer 117, the thickness and electrical resistance characteristics of photoconductive layer 116 are such that a detectable amount of current will pass from conductor segment 130A through photoconductive wafer 116 to any one of horizontal conductive segments 131 in layer 115 being monitored for current flow. When current is passing through conductor segment 130A and the thickness of photoconductive layer 116 is generally uniform at all points thereon, current will generally flow from segment 130A through layer 116 to horizontal conductor 131A over the shortest distance between segments 130A and 131A, i.e., current will flow from segment 130A to segment 131A in a direction of travel generally perpendicular to segments 130A and 131A and, consequently, perpendicular to all segments 130 and 131 in layers 117 and 115. During utilization of the apparatus of the invention, when a charge $V_P$ is put across vertical conductor line 130A in layer 117, all horizontal lines 131 in layer 115 are sequentially separately read in 1/15,750th of a second. The charge $V_P$ is then removed from line 130A and placed across the next vertical conductor line 130B in layer 117 and each of the horizontal lines 131 in layer 115 is again sequentially read in 1/15,750th of a second. This process is continued until a reference charge $V_P$ has been placed across each vertical conductor segment 130 in layer 117 and each horizontal line 131 in layer 115 is sequentially read to obtain the voltage $V_{IP}$ across the line 131 while a reference charge $V_P$ is across a vertical line 130. If there is no light beam image 80 passing into the wafer of FIGS. 6 and 7 when a reference charge $V_P$ is put across each vertical conductor segment 130A in layer 117, the signal $V_{IP}$ read on each horizontal line 131 in layer 115 will generally equal the signal $V_{IP}$ read on the other horizontal lines 131 in layer 115. However, when a panchromatic light beam image 80 is directed into the wafer of FIG. 6 by a camera lens 11, light from beam 80 striking layer 116 alters the electrical conductivity of layer 116 at each point thereon, and the voltage reading $V_{IP}$ for each horizontal segment 131 in layer 115 will be differnt from the reading obtained when a beam 80 was not directed into the wafer. Further, the intensity of light striking photoconductive layer 116 at one point generally will not be equivalent to the intensity of light striking layer 116 at different points thereon. As a result, when a reference voltage charge $V_P$ is placed across a vertical line 130A in layer 117 for 1/15,750th of a second and each horizontal conductor segment 131 in layer 115 is sequentially read, the voltage $V_{IP}$ across each horizontal segment 131 in layer 115 will not equal the voltage across the other segments 131 in the layer and, as earlier noted, will differ from the reading obtained for the segment when a light beam image 80 is not directed into the wafer and reference voltage $V_P$ is placed across line 130A. Consequently, when light beam image 80 is directed into the wafer of FIG. 6, voltage values $V_{IP}$ for each segment 131 in layer 115 provide information on the intensity of light striking points on layer 116 at which vertical lines 130 and horizontal lines 131 are closest to one another. As would be appreciated by those of skill in the art, the panchromatic data $V_{IP}$ produced by the grid layer combination 117-116-115 can, along with similar data $V_{IY}$ and $V_{IR}$ generated by yellow grid layer combination 111-110-109 and red grid layer combination 105-104-103, respectively, be analyzed by a masking system 32 like that described in FIG. 4 or by any other appropriate masking system and processed through matrix 37, modulator 40 and adder 44 to develop an overall color picture signal.

Yellow grid layer combination 111-110-109 and red grid layer combination 105-104-103 function in the manner described above for panchromatic grid layer combination 117-116-115. In FIG. 6, $V_Y$ represents the reference voltage sequentially placed across each vertical conductor segment 130 in layer 112 while arrow $V_{IY}$ represents the voltage reading obtained for each horizontal line 131 in grid layer 109. $V_R$ represents the voltage charge sequentially placed across each vertical conductor segment 130 in layer 105 while arrow $V_{IR}$ represents the voltage reading obtained for each horizontal line 131 in grid layer 103. Digital data signals $V_{IP}$, $V_{IY}$, $V_{IR}$ are transmitted to masking system 32 in FIG. 1. Masking system 32 processes the digital data and transmits yellow 30, red 31, blue 35 and green 36 signals to matrix 37. Matrix 37, modulator 40 and adder 44 then generate an overall color signal 50.

In operation, a panchromatic light image beam 80 is directed into the wafer of FIGS. 6 and 7 and passes through layers 120 to 115, and a reference voltage $V_P$ is sequentially directed across each vertical line in layer 117 for 1/15,750th of a second. While voltage $V_P$ is directed through a vertical line 130 in layer 117, each horizontal line 131 in layer 115 is sequentially read to produce data $V_{IP}$ indicating the intensity of panchromatic light striking and passing through a plurality of points on photoconductive layer 116, where a "point" on layer 116 comprises the location at which a vertical line in layer 117 is closest to a particular horizontal line 131 in layer 115. Digital data $V_{IP}$ obtained when beam 80 is passing through the wafer is transmitted to masking system 32 where the data is compared to $V_{IP}$ data obtained when there was no light beam 80 passing into the wafer and reference voltage $V_P$ was passed through each vertical line 130 in layer 117 and readings $V_{IP}$ were obtained for the horizontal lines 131 in layer 115. After the $V_{IP}$ data is processed by the masking system 32 it is transmitted to matrix 37, modulator 40 and adder 44 as indicated in FIG. 1.

When light from beam 80 passes through layers 114-109 and grid-layer combination 111-110-109 a reference voltage $V_Y$ is sequentially directed across each vertical line 130 in layer 111. Voltage $V_P$ is directed across each line 130 for 1/15,750th of a second. When voltage $V_P$ is directed through a vertical line 130 in layer 111 each horizontal line 131 in layer 110 is sequentially read to produce digital data $V_{IY}$ indicating the intensity of yellow light striking and passing through a plurality of points on photoconductive layer 116, where a "point" on layer 110 comprises the location at which a vertical line 130 in layer 111 is closest to a particular horizontal line 131 in layer 109. Data $V_{IY}$ is directed to masking system 32 along with panchromatic data $V_{IP}$. Data $V_{IY}$ is processed in a manner similar to that described for panchromatic data $V_{IP}$, i.e., is compared with $V_{IY}$ data obtained when a light beam 80 is not directed into the wafer of FIG. 6 and reference voltage $V_Y$ is placed across each vertical line 130 in layer 111.

When light from beam 80 passes through layers 108 to 103, and through grid-layer combination 105-104-103, reference voltage $V_R$ is sequentially directed across each vertical line 130 in layer 105. Voltage is directed across each vertical line 130 for a period of 1/15,750th of a second. When voltage $V_R$ is directed through a vertical line 130 in layer 105, each horizontal line 131 in layer 103 is sequentially read to produce data $V_{IR}$ indicating the intensity of red light striking and passing through a plurality of points on photoconductive layer 104, where a "point" on layer 104 comprises the location at which a vertical line 130 is closest to a particular horizontal line 131. Digital data $V_{IR}$ is directed to masking system 32 and is processed in a manner similar to that described for panchromatic data $V_{IP}$, i.e. is compared with $V_{IR}$ data obtained when a light beam 80 is not directed into the wafer of FIG. 6 and reference voltage $V_R$ is placed across each vertical line 130 in layer 105. After masking system 32 has analysed the $V_{IP}$, $V_{IY}$ and $V_{IR}$ data to determine the intensity of light striking a plurality of points on each photoconductive layer 116, 110, 104, system 32, along with matrix 37, modulator 40 and adder 44, produces an overall color television picture signal 50. As would be appreciated by those of skill in the art, in order to analyze the $V_{IP}$, $V_{IY}$ and $V_{IR}$ data, the microprocessor utilized in the operation of masking system 32 must be provided with data indicating the thickness of each layer 116, 110, 104 and the photoconductive properties thereof.

In FIG. 2 red, yellow and green signals are shown as being extracted from photoreceptor 73 because the yellow signal contains red and green signals.

Light image beam 80 will experience attenuation as it passes through the wafer of FIGS. 6 and 7. Such attenuation is readily calculated and compensated for during processing of digital data $V_{IP}$, $V_{IY}$, $V_{IR}$ by taking into account the thickness 122, impurity content and other light attenuation characteristics of each layer 103-120.

Having described my invention in such terms as to enable those skilled in the art to understand and practice it, and having identified the presently preferred embodiments and best mode thereof, I claim:

1. A color processing system for a camera including a lens, said system receiving panchromatic light focused by said lens of said camera to form a panchromatic image beam and producing a panchromatic signal of the image beam, a primary additive color signal of the image beam; and a primary subtractive color signal of the image beam, said system including (a) a first transparent photosensitive surface for receiving at least a portion of said panchromatic image beam and producing an electrical signal thereof;

(b) a first transparent color filter for receiving at least a portion of said panchromatic image beam, said first filter permitting a primary substractive color image beam to pass therethrough;

(c) a second transparent photosensitive surface for receiving at least a portion of said primary subtractive color image beam passed by said first color filter and producing an electrical signal thereof;

(d) a second transparent color filter for receiving at least a portion of said primary substractive color light image beam passed by said second photosensitive surface, said second filter permitting a primary additive color beam to pass therethrough; and (e) a third photosensitive surface for receiving at least a portion of said primary additive color image beam passed by said second transparent color filter and producing an electrical signal thereof.

2. The color processing system of claim 1 including masking means for receiving said electrical signals produced by said first, second and third photosensitive surfaces and producing a pair of new electrical signals of said image beam, each of said pair of new electrical signals and of the electrical signal produced by said third photosensitive surface representing said image beam as a different one of the three primary additive colors red, blue and green.

* * * * *